United States Patent [19]

Boffardi

[11] Patent Number: 5,137,657
[45] Date of Patent: Aug. 11, 1992

[54] SYNERGISTIC COMBINATION OF SODIUM SILICATE AND ORTHOPHOSPHATE FOR CONTROLLING CARBON STEEL CORROSION

[75] Inventor: Bennett P. Boffardi, Bethel Park, Pa.

[73] Assignee: Merck & Co., Inc., Rahway, N.J.

[21] Appl. No.: 690,876

[22] Filed: Apr. 24, 1991

[51] Int. Cl.$^5$ .............................................. C23F 11/18
[52] U.S. Cl. .................................. 252/387; 210/694; 422/18
[58] Field of Search ............... 252/389.3, 389.23, 387; 210/699, 697, 696, 396, 397; 422/18

[56] References Cited

U.S. PATENT DOCUMENTS

| | | | |
|---|---|---|---|
| 2,742,369 | 4/1956 | Hatch | 106/14.12 |
| 3,022,133 | 2/1962 | Hatch | 422/19 |
| 3,337,496 | 8/1967 | Pines et al. | 528/32 |
| 3,349,031 | 10/1967 | Hatch et al. | 210/722 |
| 3,483,133 | 12/1969 | Hatch et al. | 252/389.22 |
| 3,507,807 | 4/1970 | Herman et al. | 252/389.3 |
| 3,532,639 | 10/1970 | Hatch | 252/389.24 |
| 3,580,855 | 5/1971 | Mickus et al. | 252/181 |
| 3,589,858 | 6/1971 | Ralston | 252/175 |
| 3,711,246 | 1/1973 | Foroulis | 422/17 |
| 3,885,914 | 5/1975 | Hollingshad et al. | 422/16 |
| 3,965,027 | 6/1976 | Boffardi et al. | 252/180 |
| 4,018,701 | 4/1977 | Ralston et al. | 252/389.24 |
| 4,172,032 | 10/1979 | Farley | 210/697 |
| 4,210,549 | 7/1980 | Hirozawa et al. | 252/76 |
| 4,241,014 | 12/1980 | Hirozawa et al. | 422/13 |
| 4,552,665 | 11/1985 | Ralston et al. | 210/697 |
| 4,640,793 | 2/1987 | Persinski et al. | 210/699 |
| 4,798,683 | 1/1989 | Boffardi et al. | 252/389.54 |
| 4,801,387 | 1/1989 | Chen | 210/699 |
| 4,828,796 | 5/1989 | Shishkin et al. | 422/18 |
| 4,867,944 | 9/1989 | Bucher et al. | 422/15 |
| 4,936,987 | 6/1990 | Persinski et al. | 210/699 |
| 5,037,478 | 8/1991 | Okai et al. | 106/479 |
| 5,076,941 | 12/1991 | Boffardi et al. | 210/753 |

FOREIGN PATENT DOCUMENTS 559697 3/1944 United Kingdom.

*Primary Examiner*—Deborah L. Kyle
*Assistant Examiner*—Valerie Fee
*Attorney, Agent, or Firm*—Raymond M. Speer; Hesna J. Pfeiffer

[57] ABSTRACT

An orthophosphate salt and sodium silicate, when used in a 3:1 ratio by weight, and in a concentration of 0.1 to 100 mg/L, are found to have a synergistic effect in controlling the corrosion of carbon steel in an aqueous system, e.g., a municipal water supply system. The synergistic combination is also useful in reducing lead solubility and leaching, and in stabilizing soluble iron and manganese and their reaction products.

9 Claims, No Drawings

SYNERGISTIC COMBINATION OF SODIUM SILICATE AND ORTHOPHOSPHATE FOR CONTROLLING CARBON STEEL CORROSION

BACKGROUND OF THE INVENTION

1. Field of the Invention

CORROSION—The present invention relates to a method for inhibiting the corrosion of metallic surfaces, especially those made of carbon steel, in contact with aqueous systems, and to compositions for use in such a method, particularly where the water of the aqueous system is oxygen-bearing. More particularly, the present invention relates to a synergistic composition comprising about 3 parts by weight of orthophosphate and about 1 part by weight of sodium silicate. In particular, sodium phosphate tribasic is the preferred form of orthophosphate.

The term "aqueous system" as used herein, is intended to describe any system which contains water in any physical state, including water which contains one or more dissolved or dispersed substances such as inorganic salts. Typical systems include, but are not limited to, cooling water systems including cooling towers, boiler water systems, desalination systems, gas scrubber units, blast furnaces, sewage sludge dewatering systems, thermal conditioning equipment, reverse osmosis units, sugar evaporators, paper processing systems, mining circuits, and the like. Where the aqueous system is a potable water source, it may be any type of drinking water system or source.

The term "carbon steel" as used herein is intended to include ferrous and ferrous-containing materials alloyed with small quantities of carbon and optionally small amounts of other metals, but to exclude those steel alloys of the type commonly referred to as "stainless", which contain nickel and/or chromium.

The corrosion of a metallic surface in an aqueous system consists of the destruction of the ferrous metal by chemical or electrochemical reaction of the metal with its immediate environment.

Where the corrosion is electrochemical in nature, a transfer or exchange of electrons is necessary for the corrosion reaction to proceed. When corrosion of the metal takes place, at least two electrochemical processes occur, and must occur, simultaneously. There is an anodic oxidation reaction in which metal ions go into solution, leaving behind electrons; and at least one cathodic reduction reaction in which species in solution are reduced by consuming the electrons produced by the anoidic reaction. With respect to ferrous or ferrous containing materials, when the water contains oxygen and is at a neutral pH or above, these processes may be illustrated by the following equations:

Anodic oxidation:

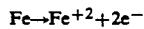

Cathodic reaction:

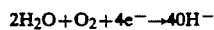

The two ionic reaction products, ferrous ion and hydroxyl ion, combine to form ferrous hydroxide, Fe(OH)$_2$, which is then oxidized to form ferric hydroxide, Fe(OH)$_3$(rust). For ferrous or ferrous-containing materials as well as other metals in aqueous systems, the principle factors influencing the corrosion process are the characteristics of the water in the system, including but not limited to the rate of water flow, the temperature of the system and contact between dissimilar metals in the system. Variable characteristics of the water which impact upon its corrosiveness are its dissolved oxygen concentration, carbon dioxide contant, pH and hardness.

The presence of dissolved oxygen in the water of an aqueous system is primarily the result of contact between the water and the atmosphere. The oxygen solubility in water is temperature and pressure dependent, with increases in pressure increasing solubility and increases in temperature lowering oxygen solubility.

Corrosion produced by the presence of oxygen in the water of an aqueous system can take place in the form of small pits or depressions and/or in the form of general metal loss. As a corrosive process continues, pits or depressions generally increase in depth. The corrosive attack is more severe when it causes pits or depressions, since the deeper penetration of the metal causes more rapid failure at these points.

MANGANESE AND IRON STABILIZATION—The synergistic combination of the present invention is also useful in stabilizing soluble manganese and iron ions and their reaction products in desirable forms and reduced particle sizes. Manganous ions are often found in well waters while cooling waters contain primarily the manganic species. Ferrous and ferric ions are often found in well waters while cooling waters contain primarily the ferric species. Anionic species of carbonate, bicarbonate, sulfite, fluoride, chloride, sulfate, and so forth, and dissolved oxygen may be present in both waters. Oxygen reaction products of manganese and iron can collect on metal surfaces and accelerate corrosion and reduce heat transfer.

LEAD LEACHING—The synergistic combination of the present invention is further useful for preventing or reducing levels of lead in potable water sources, i.e., drinking water. It has long been known that there is a strong link between lead contamination in drinking water and adverse health effects in humans.

2. Brief Description of the Prior Art

A variety of compositions have been employed in the art for the purpose of inhibiting corrosion of surfaces in water-carrying systems where the cause of corrosion is dissolved oxygen. Polyphosphates such as sodium tripolyphophate are widely used in the treatment of once-through systems. See U.S. Pat. No. 2,742,369. Silicates, for example sodium silicate, have also found acceptance.

U.S. Pat. No. 3,483,133 discloses a corrosion inhibiting composition comprising amino-tris (methylene phosphonic) acid compounds in combination with water soluble zinc salts.

Other conventional inhibitors such as zinc, soluble zinc salts, chromates, benzotriazole, tolytriazole or mercaptobenzothiazole may be added to the final formulation in varying amounts to improve its usefulness in a wider variety of industrial applications where both low carbon steel and copper or its alloys are present in the same system. Similarly, polymeric dispersants such as polyacrylates, polyacrylamides or polymers of 2-acrylamidomethylpropane sulfonic acid may also be incorporated in the final formulation in varying amounts. The molecular weights of these dispersants may vary from as low as less than 1000 to as high as several million.

Still other compositions for inhibiting corrosion are known. See, e.g., Boffardi U.S. Pat. No. 4,798,683 (molybdate compositions); Ralston U.S. Pat. No. 3,589,858 (readily soluble phosphate glasses); Hollingshad U.S. Pat. No. 3,885,914 (low molecular weight polymers and zinc); Ralston U.S. Pat. No. 4,018,701 (phosphorous acid and zinc); Hatch U.S. Pat. No. 3,532,639 (zinc salts and derivatives of methanol phosphonic or diphosphonic acid); and Hatch U.S. Pat. No. 3,022,133 (chromates/dichromates and zinc).

One method for removing soluble manganese by precipitation and removal involves the addition of a salt of iron, copper, or cobalt and any compound yielding bisulfite ions in solution to the manganese-containing water. See Hatch—U.S. Pat. No. 3,349,031.

Soluble manganese ion and its reaction products have been stabilized in water systems using carboxylic acid/sulphonic acid copolymers. See Ralston—U.S. Pat. No. 4,552,665.

The use of orthophosphate has reduced lead solubility in both low- and high-alkalinity waters. An orthophosphate concentration of approximately 1 to 2 mg/L $PO_4$ can be effective in reducing lead solubility over a much lower pH range than would be possible by using pH-carbonate adjustment.

Adding zinc/polyphosphate to municipal distribution systems has been an effective treatment program for controlling corrosion, as well as stabilizing iron and manganese. Although polyphosphates are not as effective as orthophosphate in reducing lead solubility, the use of zinc/polyphosphate has broad applicability. The effective pH range is 6 to 7.5, but maintaining the pH above neutral is recommended.

Treatments utilizing silicates appear to have a retarding effect on lead solubility, but require a relatively long period of time, approximately 8 to 9 months, to show reductions in lead concentrations. This long-term effect can be explained by the slow formation of a kinetically-inhibited lead silicate film. Silicate treatments, however, are not recommended for control of lead solubility in distribution systems.

SUMMARY OF THE INVENTION

The present invention relates to a carbon steel corrosion inhibiting composition comprising about 3 parts by weight of orthophosphate and about 1 part by weight of sodium silicate. In particular, sodium phosphate tribasic is the preferred form of orthophosphate.

The present invention further relates to a method of inhibiting the corrosion of carbon steel in an aqueous system comprising the step of treating said system with an effective corrosion-inhibiting amount of a composition comprising about 3 parts by weight of orthophosphate and about 1 part by weight of sodium silicate. In particular, the present invention relates to such a treatment method in which sodium phosphate tribasic is preferred as the orthophosphate, and the composition is used in an amount sufficient to achieve a concentration of the total composition of from 0.1 to 100 mg/L in said aqueous system, preferably from 1.0 to 50 mg/L, and most preferably from 2 to 25 mg/L.

The present invention further relates to a method of inhibiting the precipitation of dissolved manganese and iron ions and their reaction products in an aqueous system, comprising the step of treating said system with an effective precipitation-inhibiting amount of a composition comprising about 3 parts by weight of orthophosphate and about 1 part by weight of sodium silicate. In particular, the present invention relates to such a treatment method in which sodium phosphate tribasic is preferred as the orthophosphate, and the composition is used in an amount sufficient to achieve a concentration of from 0.1 to 50 mg/L in said aqueous system, preferably from 1.0 to 50 mg/L, and most preferably from 2 to 25 mg/L.

The present invention still further relates to a method of reducing the amount of soluble lead in a potable water source comprising treating said water with an effective amount of a composition comprising about 3 parts by weight of orthophosphate and about 1 part by weight of sodium silicate. In particular, the present invention relates to such a treatment method in which sodium phosphate tribasic is preferred as the orthophosphate, and the composition is used in an amount sufficient to achieve a concentration of from 0.1 to 100 mg/L in said aqueous system, preferably from 1.0 to 50 mg/L, and most preferably from 2 to 25 mg/L.

DETAILED DESCRIPTION OF THE INVENTION

The orthophosphates useful in the compositions and methods of the present invention all have $PO_4$ as the anion portion of the total salt, i.e., a salt of orthophosphoric acid. This is the active ionic component with respect to providing the benefits of the methods of the present invention in inhibiting carbon steel corrosion, and inhibiting the precipitation of manganese and iron ions and their reaction products, and also reducing lead solubility in said water. The cation portion of the total salt is relatively unimportant, except with respect to solubility, which, it will be appreciated, is critical to the method of the present invention, since it requires the addition of the orthophosphate salt to an aqueous system being treated, including a potable water source. Thus, the most soluble salt forms will generally be the most preferred for use in the methods of the present invention.

The cation portion is selected from the alkali metals Li, Na, K and $NH_4$, or combinations of these with the alkaline earth metals Mg, Ca and Ba. Since the $PO_4$ anion portion has a $-3$ valency, the most common alkali metal salt forms will simply have three cations of the same metal, e.g., $Na_3PO_4$. This form, which is often referred to as sodium phosphate tribasic, is the most common form and the most preferred form for use in the method of the present invention. The alkali metals may be different, e.g., $LiNa_2PO_4$ or $NaK_2PO_4$. Where the alkaline earth metals are present, usually only one will be present because they have a $+2$ valency, and there will usually be an alkali metal present to balance valencies. Thus, $MgNaPO_4$ may be used. Other combinations of the alkali and alkaline earth metals are possible, e.g., $Na_2Mg_2(PO_4)_2$, but these are less preferred forms.

The most preferred orthophosphate for use in the methods of the present invention, sodium phosphate tribasic, or trisodium orthophosphate, crystallizes with 8 and 12 mols of $H_2O$. The dodecahydrate is in the form of colorless or white crystals which, when rapidly heated, melts at about 75° C. It is soluble in 3.5 parts of water. Accordingly, such a material can be added directly to an aqueous system to be treated, including a potable water source in the amount required to inhibit carbon steel corrosion, and inhibit precipitation of manganese and iron ions and their reaction products, as well as to reduce lead leaching.

The orthophosphate is used in the composition of the present invention in an amount which gives a weight ratio to sodium silicate of about 3:1. The weight of $PO_4$ only is used in this calculation, and not the weight of the total orthophosphate salt. The term "about" means that amounts more than or less than the precise amount which gives the 3:1 ratio are also a part of the present invention so long as the synergistic effect of the combination is obtained. It is contemplated that in practice the amounts thus included will normally between 2.85:1 and 3.15:1.

The sodium silicate which is used in the compositions and methods of the present invention, has one or more of the compositions shown by the formulas: $Na_2SiO_3$, $Na_6Si_2O_7$, and $Na_2Si_3O_7$, and is also known as water glass and sodium metasilicate. It is preferred for practical reasons to use the sodium silicate in liquid form, i.e., as an aqueous solution, which may consist of varying compositions with respect to the ratio between sodium and silica, as well as being of various densities.

The sodium silicate is used in the composition of the present invention in an amount which gives a weight ratio to orthophosphate of about 1:3. The weight of $SiO_2$ only is used in this calculation, and not the weight of the sodium portion of the salt. The term "about" means that amounts more than or less than the precise amount which gives the 1:3 ratio are also a part of the present invention so long as the synergistic effect of the combination is obtained. It is contemplated that in practice the amounts thus included will normally between 0.85:3 and 1.15:3.

The amounts of the 3:1 orthophosphate: sodium silicate composition of the present invention, that are required to be added for the desired maximum inhibition of carbon steel corrosion will be such as to provide an ultimate concentration of the total composition of the present invention in the aqueous system being treated of between 0.1 and 100 mg/L, and preferably this concentration will be between 1.0 and 50 mg/L. Most preferably the concentration will be between 2 and 25 mg/L, although it is understood that many factors, of the type which have been explained in detail with regard to the background to the present invention, will determine the actual amount of the composition of the present invention which will be added to any particular aqueous system in order to achieve the maximum amount of inhibition of carbon steel corrosion in that aqueous system. The calculation of those amounts will be well within the skill of the artisan in this field.

The amounts of the 3:1 orthophosphate: sodium silicate composition of the present invention, that are required to be added for the desired maximum inhibition of precipitation of manganese and iron ions and their reaction products will be such as to provide an ultimate concentration of the total composition of the present invention in the aqueous system being treated of between 0.1 and 100 mg/L, and preferably this concentration will be between 1.0 and 50 mg/L. Most preferably the concentration will be between 2 and 25 mg/L, although it is understood that many factors, of the type which have been explained in detail with regard to the background to the present invention, will determine the actual amount of the total composition of the present invention which will be added to any particular aqueous system in order to achieve the maximum amount of inhibition of precipitation of manganese and iron ions and their reaction products in that aqueous system. The calculation of those amounts will be well within the skill of the artisan in this field.

The manner of addition of the orthophosphate and sodium silicate composition of the present invention to an aqueous system, including a potable water source, will also be straightforward to a person of ordinary skill in this art. It may be added in finely subdivided solid form by mechanical dispensers of known design. It may also be added in solid form, but in the form of a matrix in which solid particles of the active ingredient are bonded or bound together by a material which is water soluble, or optionally, does not dissolve at all. Such a matrix allows for regular leaching out or dissolving of the active ingredient particles, whereby it is possible to obtain a sustained release and more unvarying concentration of the orthophosphate and sodium silicate composition in the water being treated. In the preferred manner of addition, the orthophosphate and sodium silicate composition of the present invention is made up in the form of concentrated solutions for dispensig in liquid form from dispensers well known in the art. The orthophosphate and sodium silicate composition of the present invention may also be combined with other chemical treatment agents for dispensing to the aqueous system, including a potable water source; and these in combination may be dispensed in solid or liquid form.

Where the aqueous system is a potable water source, it may be as simple as a well, municipal plant or private water company supplying a single residence, the water of which is treated for the purpose of softening, etc., and there is then added to the chemical agents used in the water treatment, the orthophosphate and sodium silicate composition, in accordance with the present invention. Where the potable water source is a major distribution system such as a municipal plant or a private water company, economies of scale can be realized using the methods of the present invention.

EXAMPLES OF PREFERRED EMBODIMENTS

The following examples demonstrate the effectiveness of the treatment methods of the present invention in synergistically inhibiting corrosion of carbon steel in water. These examples are illustrative only, and are not intended to be a limitation of the present invention.

EXAMPLE 1

Corrosion Inhibition

TEST PROTOCOL FOR MUNICIPAL CORROSION STUDY: the test consisted of large a bath with a capacity of 42 liters. The solution composition listed in Table 1 below was used. A constant temperature immersion circulator was used to control the solution temperature and agitate the controlled bath. Temperature was maintained at 25° C. The pH of the solution was controlled with a pH stat at 7.5. The bath was continuously aerated through a medium porosity gas dispersion tube to ensure air saturation.

Two carbon steel coupons (SAE-1010) having a surface area of 4.2 square inches were suspended in the 42 liters of water. After seven days the coupons were removed, cleaned, and weighed to determine corrosion rate in mils per year.

Each test contained a different ratio of $SiO_2:PO_4$. The orthophosphate content was obtained from sodium phosphate tribasic. The $SiO_2$ content was obtained from type N silicate from the PQ corporation.

| Solution Composition | |
|---|---|
| SPECIES | CONCENTRATION mg/L |
| Calcium | 4.4 |
| Magnesium | 1.2 |
| Bicarbonate | 25 |
| Chloride | 3.5 |
| Sulfate | 16.4 |
| Total hardness as $CaCO_3$ | 16.0 |

The following solutes were then prepared:

$$10 \text{ g/L } SiO_2 = \frac{10 \text{ g/L } SiO_2}{0.287\% \ SiO_2} = 34.84 \text{ g/L type N silica}$$

in type N silica $$8 \text{ g/L } PO_4 = \frac{8 \text{ g/L } PO_4}{0.2498\% \ PO_4} = 32.02 \text{ g/L sodium phosphate}$$

in sodium phospate tribasic

| Bath Conditions |
|---|
| Bath No. 1  10 ppm $SiO_2$ |
| 41.6 ml 10 g/L $SiO_2$ |
| Bath No. 2  7.5 ppm $SiO_2$:2.5 ppm $PO_4$ |
| 31.2 ml 10 g/L $SiO_2$; 13.0 ml 8 g/L $PO_4$ |
| Bath No. 3  5.0 ppm $SiO_2$:5.0 ppm $PO_4$ |
| 20.8 ml 10 g/L $SiO_2$; 26.0 ml 8 g/L $PO_4$ |
| Bath No. 4  2.5 ppm $SiO_2$:7.5 ppm $PO_4$ |
| 10.5 ml 10 g/L $SiO_2$; 39.0 ml 8 g/L $PO_4$ |
| Bath No. 5  10 ppm $PO_4$ |
| 52.0 ml 8 g/L $PO_4$ |

Coupons of carbon steel were placed in baths of the above compositions for slightly over 7 days, with the results described below.

| Test Results-Weight Loss | | |
|---|---|---|
| BATH COUPON | CORROSION INHIBITOR COMPOSITION | WEIGHT LOSS (G) |
| 1 A | 10 ppm $SiO_2$ | 0.19287 |
| B | 10 ppm $SiO_2$ | 0.19875 |
| 2 A | 7.5/2.5 ppm $SiO_2$:$PO_4$ | 0.09257 |
| B | 7.5/2.5 ppm $SiO_2$:$PO_4$ | 0.04530 |
| 3 A | 5.0/5.0 ppm $SiO_2$:$PO_4$ | 0.02283 |
| B | 5.0/5.0 ppm $SiO_2$:$PO_4$ | 0.02746 |
| 4 A | 2.5/7.5 ppm $SiO_2$:$PO_4$ | 0.01646 |
| B | 2.5/7.5 ppm $SiO_2$:$PO_4$ | 0.01685 |
| 5 A | 10 ppm $PO_4$ | 0.05750 |
| B | 10 ppm $PO_4$ | 0.02020 |

The corrosion rate was calculated in accordance with the following equation:

$$\text{CORROSION RATE} = \frac{534 \times \Delta \text{ WEIGHT (MG)}}{\text{DENSITY (cc)} \times \text{AREA (IN}^2) \times \text{TIME (HRS)}}$$

where
DENSITY = 7.84 cc; AREA = 4.3 $in^2$; TIME = 160.50 hrs.

| Test Results - Corrosion Rate | | | |
|---|---|---|---|
| BATH COUPON | BATH CONDITIONS | CORROSION RATE (MPY) | AVERAGE |
| 1 A | 10 ppm $SiO_2$ | 19.03 | 19.32 |
| B | 10 ppm $SiO_2$ | 19.61 | |
| 2 A | 7.5 ppm $SiO_2$ | 9.14 | 6.81 |
| B | 2.5 ppm $PO_4$ | 4.47 | |
| 3 A | 5 ppm $SiO_2$ | 2.25 | 2.48 |
| B | 5 ppm $PO_4$ | 2.71 | |
| 4 A | 2.5 ppm $SiO_2$ | 1.62 | 1.64 |
| B | 7.5 ppm $PO_4$ | 1.66 | |
| 5 A | 10 ppm $PO_4$ | 5.67 | 3.83 |
| B | 10 ppm $PO_4$ | 1.99 | |

What is claimed is:

1. A carbon steel corrosion inhibiting composition for use in potable water systems, consisting essentially of about 3 parts by weight of orthophosphate and about 1 part by weight of sodium silicate, wherein said weights are based on $PO_4$ and $SiO_2$, respectively.

2. A composition according to claim 1 wherein the orthophosphate is sodium phosphate tribasic.

3. A method of inhibiting the corrosion of carbon steel from which a potable water distribution system is constructed, comprising the step of treating said system with an effective corrosion-inhibiting amount of a composition consisting essentially of about 3 parts by weight of orthophosphate and about 1 part by weight of sodium silicate, wherein said weights are based on $PO_4$ and $SiO_2$, respectively.

4. A method according to claim 3 wherein the orthophosphate is sodium phosphate tribasic.

5. A method according to claim 3 wherein the composition is used in an amount sufficient to achieve a concentration of the total composition of from 0.1 to 100 mg/L in said aqueous system.

6. A method according to claim 5 wherein the concentration of the composition in the aqueous system is from 1.0 to 50 mg/L.

7. A method according to claim 6 wherein the concentration of the composition in the aqueous system is from 2 to 25 mg/L.

8. A method of inhibiting the precipitation of dissolved manganese and iron ions and their reaction products in a potable water system, comprising the step of treating said system with an effective precipitation-inhibiting amount of a composition consisting essentially of about 3 parts by weight of orthophosphate and about 1 part by weight of sodium silicate, wherein said weights are based on $PO_4$ and $SiO_2$, respectively.

9. A method according to claim 8 wherein the orthophosphate is sodium phosphate tribasic and the composition is used in an amount sufficient to achieve a concentration of the total composition of from 0.1 to 100 mg/L in said aqueous system.

* * * * *